(12) United States Patent
Tachiki

(10) Patent No.: US 11,787,003 B2
(45) Date of Patent: Oct. 17, 2023

(54) MACHINE TOOL

(71) Applicant: FANUC CORPORATION, Yamanashi (JP)

(72) Inventor: Shingo Tachiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 594 days.

(21) Appl. No.: 16/792,445

(22) Filed: Feb. 17, 2020

(65) Prior Publication Data
US 2020/0316741 A1  Oct. 8, 2020

(30) Foreign Application Priority Data
Apr. 2, 2019  (JP) .................. 2019-070587

(51) Int. Cl.
*B23Q 15/12* (2006.01)
*G05B 19/416* (2006.01)
*B23Q 5/12* (2006.01)

(52) U.S. Cl.
CPC ........... *B23Q 5/12* (2013.01); *G05B 19/4163* (2013.01)

(58) Field of Classification Search
None
See application file for complete search history.

(56) References Cited

U.S. PATENT DOCUMENTS

| | | |
|---|---|---|
| 6,501,997 B1 | 12/2002 | Kakino |
| 2003/0083772 A1 | 5/2003 | Shiba et al. |
| 2004/0172159 A1 | 9/2004 | Noda et al. |
| 2006/0186845 A1 | 8/2006 | Terada et al. |
| 2010/0079096 A1 | 4/2010 | Braun et al. |
| 2010/0148714 A1 | 6/2010 | Okita et al. |
| 2013/0198442 A1 | 8/2013 | Braun et al. |
| 2013/0198443 A1 | 8/2013 | Braun et al. |
| 2015/0177710 A1 | 6/2015 | Kigaku et al. |
| 2016/0170400 A1 | 6/2016 | Iijima |
| 2016/0231730 A1* | 8/2016 | Wakana ............... G05B 19/409 |

(Continued)

FOREIGN PATENT DOCUMENTS

| | | |
|---|---|---|
| EP | 0905593 A1 | 3/1999 |
| EP | 1413977 A2 | 4/2004 |

(Continued)

OTHER PUBLICATIONS

Iwasaki, Yu; Notice of Reasons for Refusal; Japanese Patent Application No. 2019-070587; dated Sep. 7, 2021; 4 pages.

(Continued)

*Primary Examiner* — Ryan A Jarrett
(74) *Attorney, Agent, or Firm* — Renner, Otto, Boisselle & Sklar, LLP

(57) ABSTRACT

This machine tool includes a spindle, a workpiece support section that supports the workpiece, a servo motor that rotates or moves workpiece support section relative to the spindle, and a control device that controls the servo motor, where the control device displays an adjustment screen for adjustment of at least either of a gain and a filter of the servo motor on a display device when the control device recognizes that the servo motor is newly mounted, when a machining program of the workpiece is changed, or when an operation value of the servo motor or a value calculated based on the operation value deviates from a predetermined criterion.

8 Claims, 8 Drawing Sheets

(56) References Cited

U.S. PATENT DOCUMENTS

| | | |
|---|---|---|
| 2018/0129190 A1 | 5/2018 | Hoshino |
| 2018/0181101 A1* | 6/2018 | Sasaki ................ G05B 19/4083 |
| 2018/0364683 A1 | 12/2018 | Iijima |
| 2018/0364684 A1 | 12/2018 | Iijima et al. |
| 2019/0061079 A1 | 2/2019 | Morimura |
| 2020/0133226 A1* | 4/2020 | Tsuneki ................ G06N 3/006 |

FOREIGN PATENT DOCUMENTS

| | | |
|---|---|---|
| EP | 3321755 A1 | 5/2018 |
| JP | S63-190584 A | 8/1988 |
| JP | H03-104205 U | 10/1991 |
| JP | H05-224731 A | 9/1993 |
| JP | H07-271416 A | 10/1995 |
| JP | H11-156672 A | 6/1999 |
| JP | 2003-140715 A | 5/2003 |
| JP | 2004-201481 A | 7/2004 |
| JP | 2006-215807 A | 8/2006 |
| JP | 2009-124803 A | 6/2009 |
| JP | 2010-148178 A | 7/2010 |
| JP | 2010-188499 A | 9/2010 |
| JP | 2011-199925 A | 10/2011 |
| JP | 2015-118620 A | 6/2015 |
| JP | 2016-035676 A | 3/2016 |
| JP | 2016-111897 A | 6/2016 |
| JP | 2018-078747 A | 5/2018 |
| JP | 2018-128734 A | 8/2018 |
| JP | 2018-140470 A | 9/2018 |
| JP | 2019-003646 A | 1/2019 |
| JP | 2019-004583 A | 1/2019 |
| JP | 2019-038067 A | 3/2019 |
| WO | WO-2004092859 A1 | 10/2004 |

OTHER PUBLICATIONS

Pasona Group Inc.; Search Report by Registered Search Organization; Japanese Patent Application No. 2019-070587; dated Jul. 30, 2021; 11 pages.

* cited by examiner

| WORKPIECE TYPE | A | | |
|---|---|---|---|
| ROTATION UNIT INERTIA | MAXIMUM ● ● | | |
| VELOCITY GAIN | 200% | | |
| AMPLITUDE FILTER | ATTENUATION CENTER FREQUENCY | ATTENUATION BANDWIDTH | DAMPING |
| 1 | 220 | 100 | 10 |
| 2 | 1100 | 600 | 0 |
| ⋮ | ⋮ | ⋮ | ⋮ |

US 11,787,003 B2

MACHINE TOOL

CROSS-REFERENCE TO RELATED APPLICATIONS

This application is based on and claims priority to Japanese Patent Application No. 2019-070587 filed on Apr. 2, 2019, the entire content of which is incorporated herein by reference.

TECHNICAL FIELD

The present invention relates to a machine tool.

BACKGROUND ART

Conventionally, motor systems that adjust settings of a gain of a motor, a filter, inertia of a motor, etc. are known. For example, PTL 1 describes such technology.

CITATION LIST

Patent Literature

{PTL 1}
Japanese Unexamined Patent Application, Publication No. 2016-035676

SUMMARY OF INVENTION

A first aspect of the present disclosure is directed to a machine tool including a spindle to which a tool is attached, a workpiece support section that supports a workpiece, a servo motor that rotates or moves the workpiece support section relative to the spindle, and a control device that controls the servo motor when machining of the workpiece is performed by the tool, wherein the control device displays an adjustment screen for adjustment of either of a gain and a filter of the servo motor on a display device or displays an indication for guidance which guides an operator to the adjustment screen on the display device when the control device recognizes that the servo motor is newly mounted, when a machining program of the workpiece is changed, or when an operation value of the servo motor or a value calculated based on the operation value deviates from a predetermined criterion.

DESCRIPTION OF EMBODIMENTS

A machine tool 1 in accordance with an embodiment will be described below with reference to the drawings.

Figure 1:
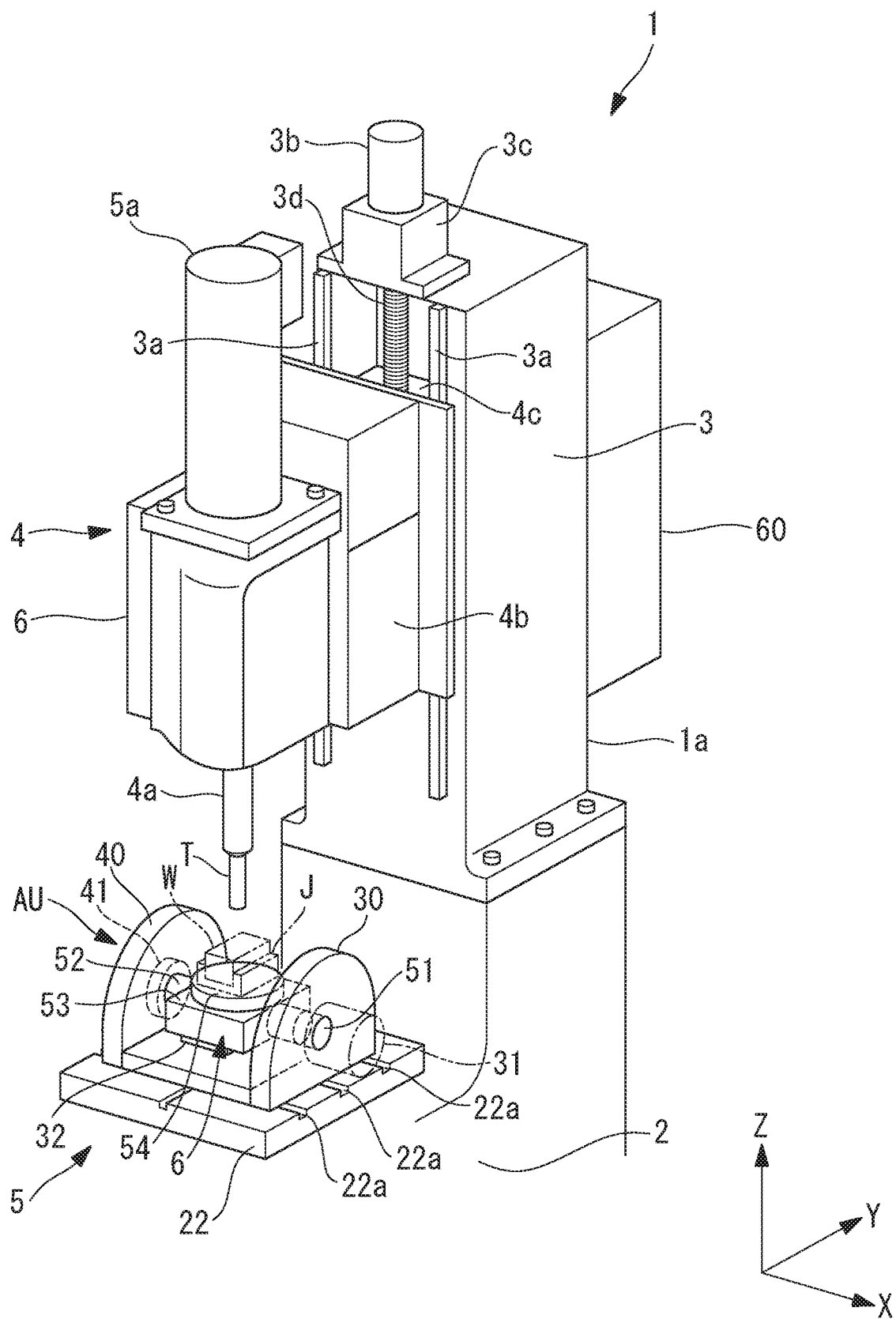
FIG. 1 is a schematic perspective view of a machine tool in accordance with one embodiment.

The machine tool 1 in accordance with this embodiment includes, as illustrated in FIG. 1, a machine tool main body 1a which has a base 2 and a column section 3 extending upward from the base 2, a spindle unit 4 supported by the column section 3 such that the spindle unit 4 is movable in an up-and-down direction, and a table unit (movement mechanism) 5 that supports a workpiece W. A not-shown tool magazine adapted for automatic exchange of tools T to be mounted to a spindle 4a of the spindle unit 4 may be provided on the spindle unit 4.

Figure 2:
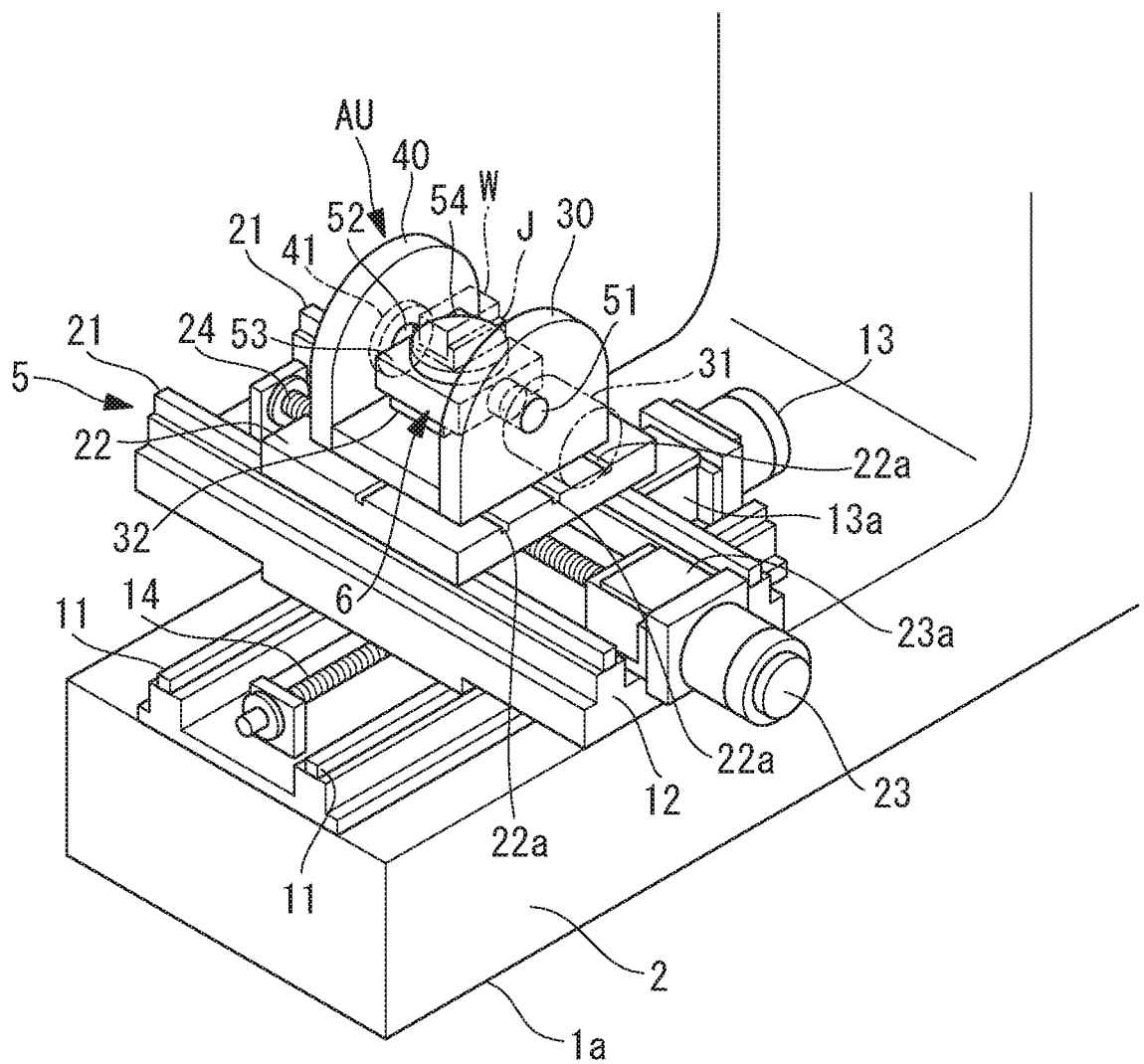
FIG. 2 is a schematic perspective view of a table unit of the machine tool of this embodiment.

The base 2 is installed at a location where the machine tool 1 is used using, for example, a leveling bolt, an anchor bolt, or the like. As illustrated in FIG. 2, the table unit 5 is arranged on the base 2, and the workpiece W is fixed to the workpiece support section (rotating table) 6 of the table unit 5 by any appropriate fixing means. The workpiece support section 6 and the workpiece W are adapted to move relative to the spindle 4a in an X-axis direction, in a Y-axis direction, about the X-axis, and about an axis extending in the up-and-down direction by means of a plurality of motors 13, 23, 31, and 32, which will be described later, provided on the table unit 5. The spindle 4a and a spindle head 4b of the spindle unit 4 are arranged above the table unit 5.

The tool T is a portion adapted to be brought into contact with the workpiece W for machining of the workpiece W and, for example, it is a tool of any appropriate type such as drills, tap milling cutters, polishing tools, etc.

The spindle head 4b rotatably supports the spindle 4a, and a spindle motor 5a adapted to rotate the spindle 4a is fixed to an upper end of the spindle head 4b. Also, the spindle head 4b is supported by the column section 3 of the machine tool main body 1a such that the spindle head 4b is movable in the up-and-down direction.

Specifically, a plurality of guide rails 3a extending in a vertical direction (Z-axis direction) are provided on the column section 3 and the spindle head 4b is supported by the guide rails 3a so as to be movable in the vertical direction. Also, a Z-axis motor 3b is fixed to the upper end of the column section 3 and the output from an output shaft of the Z-axis motor 3b is transmitted via a decelerator 3c and the like to a ball screw 3d. The ball screw 3d is arranged along the guide rails 3a and the ball screw 3d is placed in threaded engagement with a ball screw nut fixed to the back surface section 4c of the spindle head 4b. By virtue of this feature, the spindle unit 4 moves in the vertical direction by means of the rotation of the output shaft of the Z-axis motor 3b.

As illustrated in FIG. 2, a plurality of guide rails 11 extending in the Y-axis direction, which is a horizontal direction, are provided on an upper surface section of the base 2, and a Y-direction movable section 12 is supported by the guide rails 11 so as to be movable in the Y-axis direction. Also, a Y-axis motor 13 is fixed to the upper end of the base 2, and the output from an output shaft of the Y-axis motor 13 is transmitted via a decelerator 13a and the like to a ball screw 14. The ball screw 14 is arranged along the guide rails 11 and the ball screw 14 is placed in threaded engagement with a ball screw nut which is part of the Y-direction movable section 12. By virtue of this feature, the Y-direction movable section 12 moves in the Y-axis direction by means of the rotation of the output shaft of the Y-axis motor 13.

Also, as illustrated in FIG. 2, a plurality of guide rails 21 extending in the X-axis direction, which is a horizontal direction, are provided at the upper surface section of the Y-direction movable section 12, and an X-Y table 22 is supported by the guide rails 21 so as to be movable in the X-axis direction. Also, an X-axis motor 23 is fixed to the upper surface section of the Y-direction movable section 12 and the output from an output shaft of the X-axis motor 23 is transmitted via a decelerator 23a and the like to a ball screw 24. The ball screw 24 is arranged along the guide rails 21, and the ball screw 24 is placed in threaded engagement with a ball screw nut which is part of the X-Y table 22. By virtue of this feature, the X-Y table 22 moves in the X-axis direction by means of the rotation of the output shaft of the X-axis motor 23.

The X-Y table 22 is, typically, a table for attaching thereto the workpiece W or a jig used to fix the workpiece W. A plurality of grooves 22a are provided on the upper surface of the X-Y table 22, and the grooves 22a are used to fix the workpiece W or the jig for fixation of the workpiece W. For example, the groove 22a has an upper end the width of which is reduced. A bolt, that has been inserted into the workpiece W or the jig to extend therethrough, is tightened into a receiving piece disposed in the groove 22a, as a result of which the workpiece W or the jig for fixation of the workpiece W is fixed to the X-Y table 22.

In a case where the workpiece W or the jig for fixation of the workpiece is fixed to the X-Y table 22, the machine tool 1 moves the tool T in the up-and-down direction by the Z-axis motor 3b, while moving the workpiece W in the X-axis direction and the Y-axis direction by the X-axis motor 23 and the Y-axis motor 13. As a result of this, predetermined machining is performed on the workpiece W.

In this embodiment, an auxiliary shaft unit (movement mechanism) AU is fixed to the X-Y table 22. The auxiliary shaft unit AU is configured to rotate the workpiece W not only in the X-axis direction and the Y-axis direction but also about the X-axis and about an axis extending in the up-and-down direction.

The auxiliary shaft unit AU has a first support section 30 fixed to the X-Y table 22 and a second support section 40 fixed to the X-Y table 22. As illustrated in FIGS. 1 and 2, the first support section 30 and the second support section 40 may be connected to each other by a plate-like connection member. When the aforementioned fixation is done, the first support section 30 and the second support section 40 are aligned in the X-axis direction. For example, a bolt, that has been inserted into a part of the first support section 30 and the second support section 40 to extend therethrough, is tightened into a receiving piece disposed in the groove 22a, as a result of which the first support section 30 and the second support section 40 are fixed to the X-Y table 22. Note that, in a case where the first support section 30 and the second support section 40 are aligned in the Y-axis direction when the aforementioned fixation is done, the auxiliary shaft unit AU will rotate the workpiece W about the Y-axis and about the axis extending in the up-and-down direction.

The auxiliary shaft unit AU has a workpiece support section 6 supported by the first support section 30 and the second support section 40. The workpiece support section 6 has a shaft 51 supported by the first support section 30 so as to be rotatable about the X-axis, a shaft 52 supported by the second support section 40 so as to be rotatable about the X-axis, and a plate member 53 both ends of which are fixed to the shafts 51, 52, respectively. The first auxiliary shaft motor 31 is fixed to the first support section 30, and the output shaft of the first auxiliary shaft motor 31 is directly fixed to the shaft 51. In other words, the rotational force of the first auxiliary shaft motor 31 is transmitted to the shaft 51 without intervention of a gear of a decelerator or the like. Such a system is sometimes called direct drive.

A fixation unit 54 is provided on the plate member 53, and the fixation unit 54 is supported by the plate member 53 so as to be rotatable about an axis extending in a direction orthogonal to the X-axis. A second auxiliary shaft motor 32 is fixed to the plate member 53, and an output shaft of the second auxiliary shaft motor 32 is directly fixed to the fixation unit 54. In other words, the rotational force of the second auxiliary shaft motor 32 is transmitted to the fixation unit 54 without intervention of a gear of a decelerator and the like. The structure is also a direct drive structure.

As illustrated in FIGS. 1 and 2, inside the second support section 40, a brake 41 for stopping the rotation of the workpiece support section 6 is provided. The brake 41 may be adapted to stop the rotation of the shaft 52 by holding the shaft 52, may be adapted to stop the rotation of the shaft 52 by magnetic force, and may also be adapted to stop the rotation of the shaft 52 by pressing a disc fixed to the shaft 52 using a piston.

The jig J for fixation of the workpiece is fixed to the fixation unit 54 and the workpiece W is fixed to the jig J. The workpiece W may be directly fixed to the fixation unit 54.

It should be noted that the auxiliary shaft unit AU can be removed from the X-Y table 22 as needed. The removal and attachment in some cases may be performed by a user of the machine tool 1.

In a case where the auxiliary shaft unit AU is attached to the X-Y table 22 and the jig J or the workpiece W is fixed to the fixation unit 54 of the auxiliary shaft unit AU, the machine tool 1 can rotate the workpiece W not only in the X-axis direction and the Y-axis direction but also about the X-axis and about an axis extending in the up-and-down direction. This feature enables sophisticated and accurate machining to be performed on the workpiece W.

The spindle motor 5a, the Z-axis motor 3b, the Y-axis motor 13, the X-axis motor 23, the first auxiliary shaft motor 31, and the second auxiliary shaft motor 32 are servo motors such as synchronous motors. Note that these motors may be servo motors other than synchronous motors.

The spindle motor 5a, the Z-axis motor 3b, the Y-axis motor 13, the X-axis motor 23, the first auxiliary shaft motor 31, and the second auxiliary shaft motor 32 each incorporate an movement position detection device such as an encoder, and the results of detection by the movement position detection device are transmitted to the control device 60 of the machine tool 1.

The spindle motor 5a, the Z-axis motor 3b, the Y-axis motor 13, the X-axis motor 23, the first auxiliary shaft motor 31, and the second auxiliary shaft motor 32 are connected to the control device 60 of the machine tool 1, and the control device 60 controls these motors 5a, 3b, 13, 23, 31, and 32.

Figure 3:
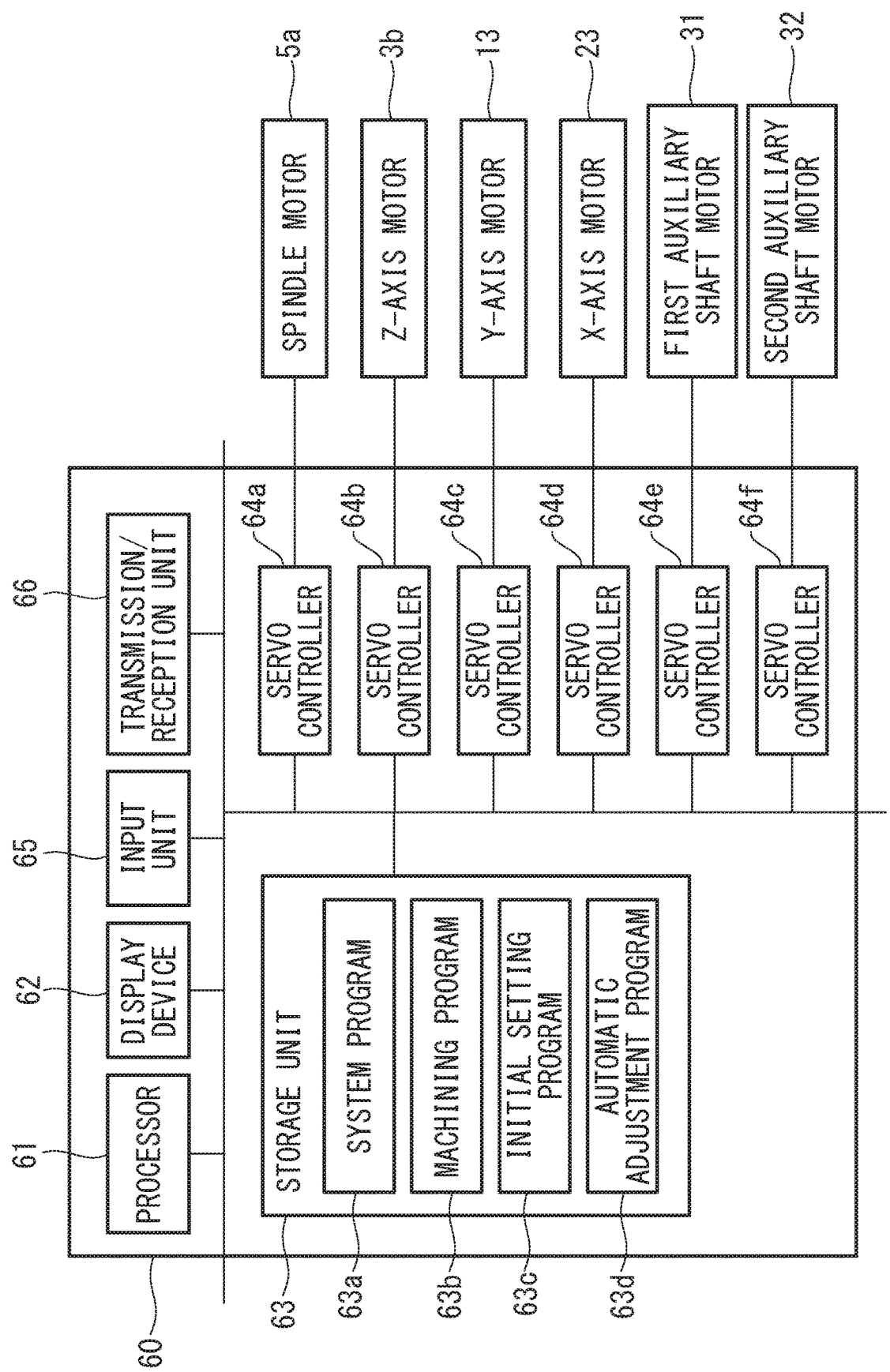
FIG. 3 is a block diagram of a control device of the machine tool of this embodiment.

The control device 60 includes, as illustrated in FIG. 3, a processor 61 that has a CPU and the like, a display device 62 such as a liquid crystal display device, a storage unit 63 that has non-volatile storage, ROM, RAM, etc.; servo controllers 64a, 64b, 64c, 64d, 64e, and 64f which correspond to the spindle motor 5a, the Z-axis motor 3b, the Y-axis motor 13, the X-axis motor 23, the first auxiliary shaft motor 31, and the second auxiliary shaft motor 32, respectively; an input unit 65 such as an operation panel; and a transmission and reception unit 66. In a case where the display device 62 has a touch screen function, the display device 62 also functions as the input unit.

The input unit 65 may be a portable operation panel, a tablet computer, etc. In the cases of them, all or part of the display device 62 will be provided in the input unit 65. The display device 62 may be provided separately from the control device 60.

A system program 63a is stored in the storage unit 63 and the system program 63a is responsible for the basic functionality of the control device 60. Also, a plurality of machining programs 63b configured in accordance with the workpieces W, an initial setting program 63c, and an automatic adjustment program 63d are stored in the storage unit 63. The control device 60 transmits, according to a series of commands of the machining program 63b, control commands, control signals, etc., to the servo controllers 64a, 64b, 64c, 64d, 64e, and 64f, by means of which the tool T rotated by the spindle motor 5a is brought into contact with the workpiece W which moves in the X-axis direction, in the Y-axis direction, about the X-axis, and about the axis extending in the up-and-down direction. As a result, machining is performed on the workpiece W.

Figure 4:
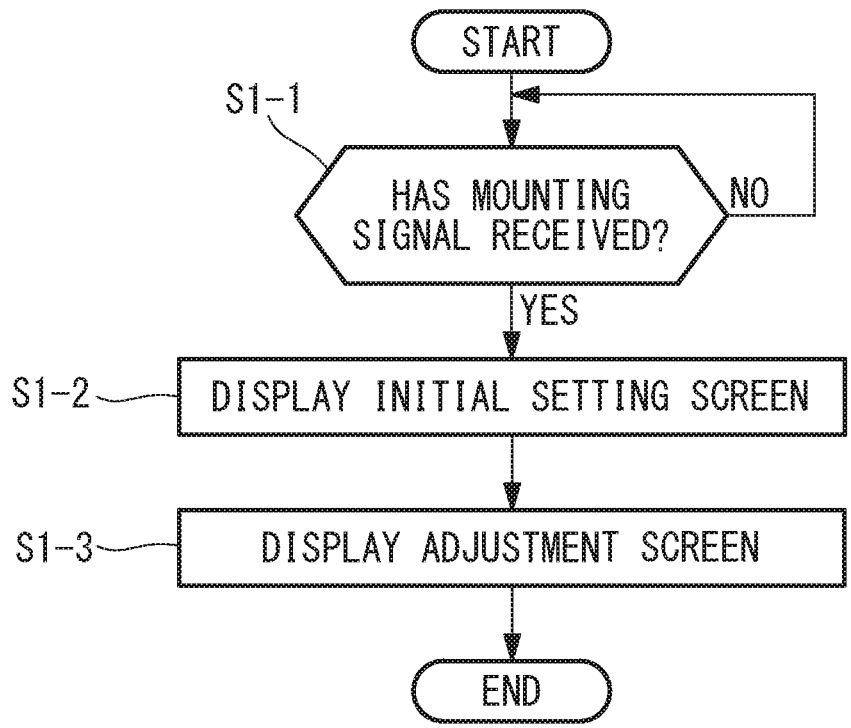
FIG. 4 is a flowchart that illustrates an example of processing by the control device of this embodiment.

In this embodiment, when the auxiliary shaft unit AU is mounted, the control device 60 displays, on the display device 62, an adjustment screen for performing adjustment of a gain and a filter of the first auxiliary shaft motor 31. The processing by the control device 60 at this point will be described using the flowchart of FIG. 4.

When the control device 60 receives a mounting signal indicating that the first auxiliary shaft motor 31 has been newly mounted (step S1-1), then the control device 60 displays the initial setting screen 71 on the display device 62 on the basis of the initial setting program 63c (step S1-2). Subsequently, the control device 60 displays an adjustment screen 72 for adjustment of the gain and filter on the display device 62 on the basis of the automatic adjustment program 63d (step S1-3). It should be noted that in some cases the initial setting screen 71 may also function as an indication screen for providing guidance which lead the operator to the adjustment screen 72. If necessary, an indication may be provided on the initial setting screen 71 to allow an operator to determine whether or not a transition to the adjustment screen 72 should be performed.

For example, when the auxiliary shaft unit AU is mounted on the X-Y table 22 and the first auxiliary shaft motor 31 is connected to the control device 60, the first auxiliary shaft motor 31 is recognized by the control device 60. Signals, data, and the like which are transmitted from the first auxiliary shaft motor 31 to the control device 60 at the time of the recognition may be examples of the aforementioned mounting signal.

It should be noted that a camera may be provided on or near the machine tool 1 and the camera may be connected to the control device 60. In this case, an image of the X-Y table 22 may be captured by the camera and the fact that the first auxiliary shaft motor 31 has been mounted may be determined by the control device 60 on the basis of the captured image.

Figure 5:
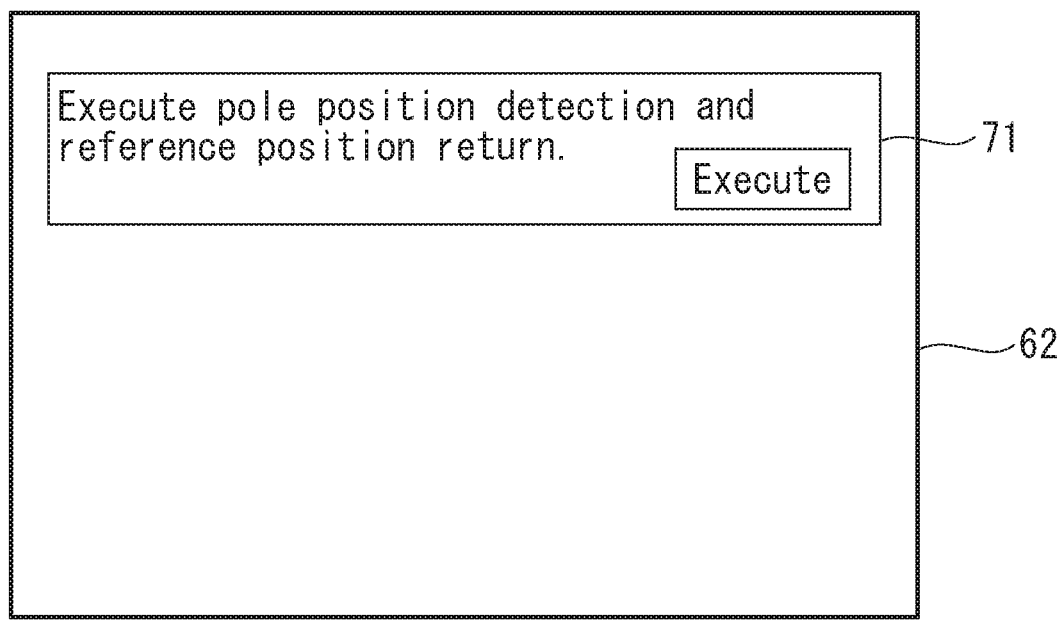
FIG. 5 is an example of an initial setting screen displayed by this embodiment.

An example of the initial setting screen is illustrated in FIG. 5. The initial setting screen 71 is a screen for performing pole position detection of the first auxiliary shaft motor 31, reference position return, and the like. In the initial setting screen 71, the initial setting is executed when a command button for executing the initial settings for the pole position detection, reference position return, etc. is operated.

Figure 6:
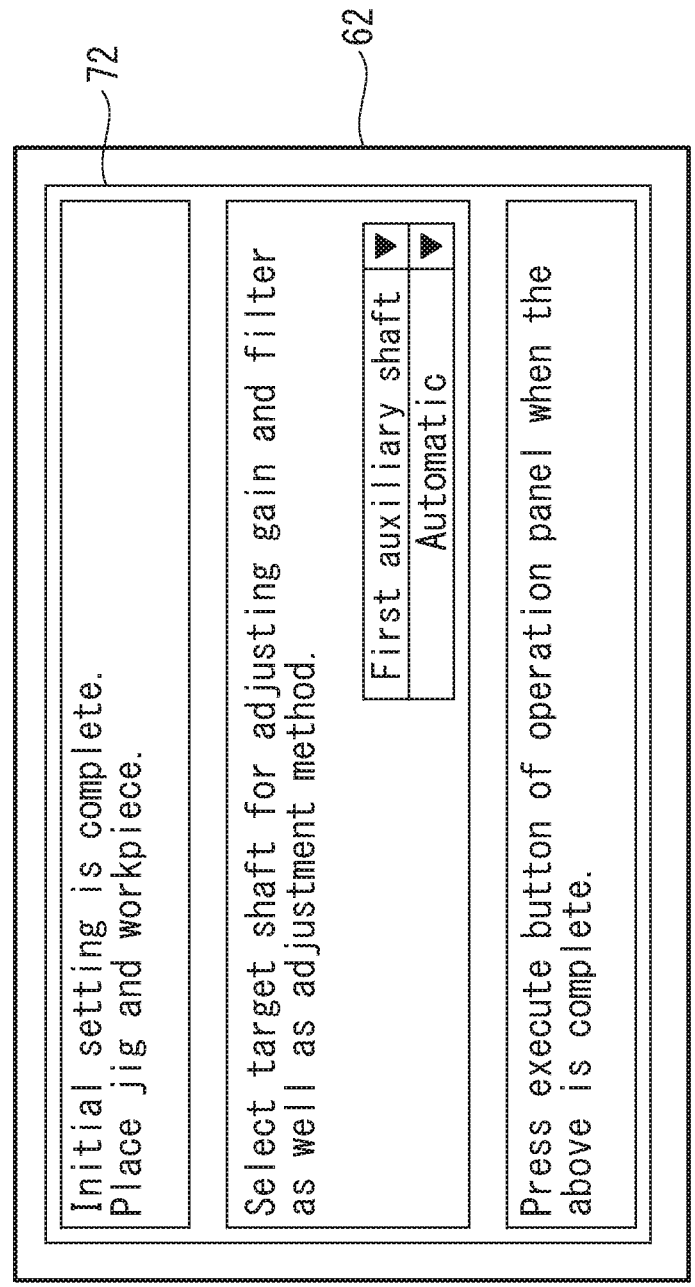
FIG. 6 is an example of an adjustment screen displayed by this embodiment.

When the initial setting is completed, an adjustment screen 72 as illustrated in FIG. 6 is displayed on the display device 62 in the step S1-3. On the adjustment screen 72 shows an indication for causing fixation of the jig J and/or the workpiece W to the fixation unit 54, an indication for inputting an auxiliary shaft of the target for which the gain, the filter, and other parameters such as the time constant, etc. should be adjusted, an indication for entering whether the adjustment should be performed manually or automatically, and other relevant indications.

Figure 7:
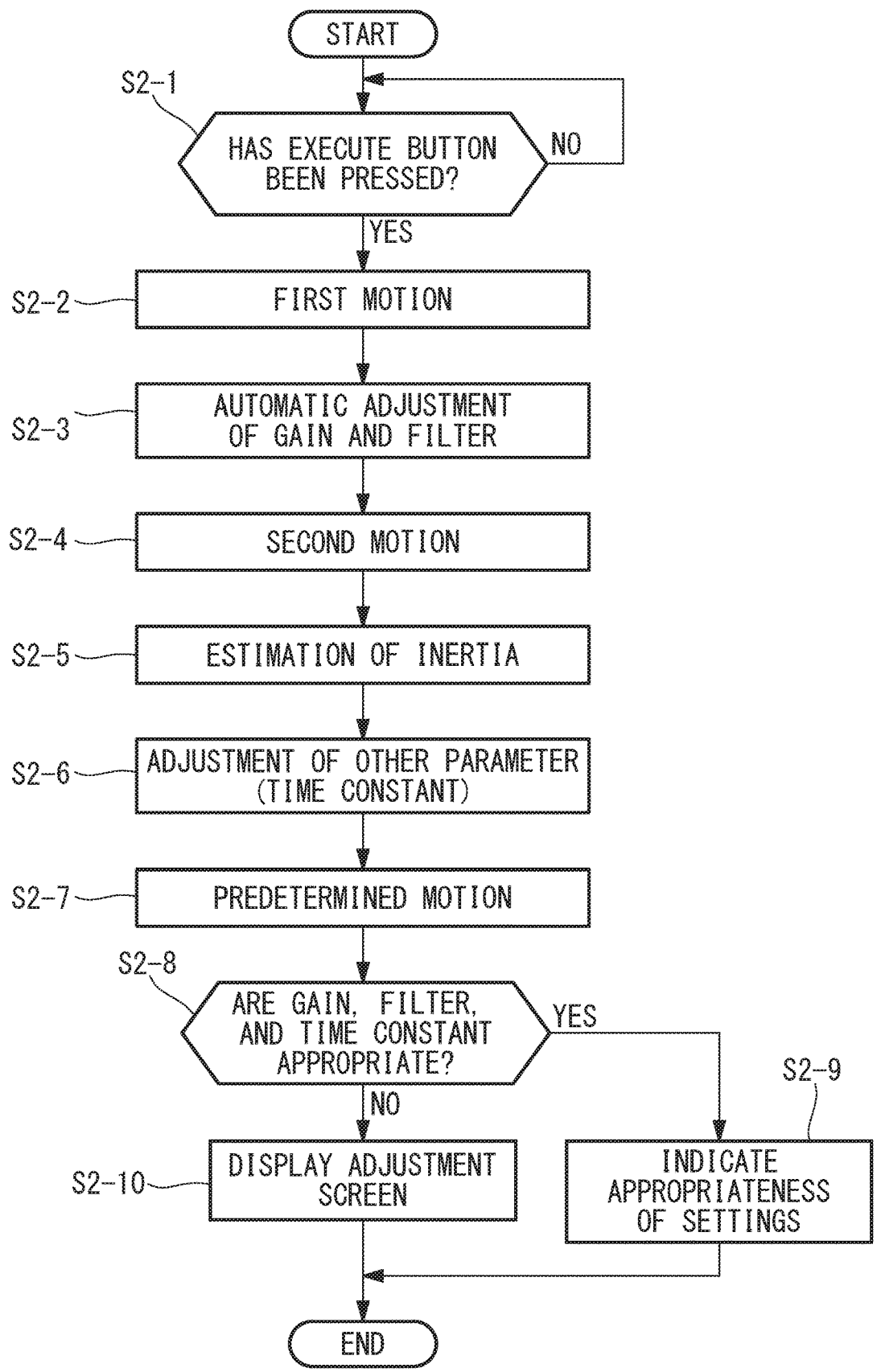
FIG. 7 is a flowchart that illustrates an example of processing by the control device of this embodiment.

In the state where the automatic adjustment has been selected by the adjustment screen 72, when a predetermined button of the input unit 65, which is an operation panel, is pressed in accordance with an instruction of the adjustment screen 72, then the control device 60 performs the automatic adjustment of the gain and the filter of the first auxiliary shaft motor 31 on the basis of the automatic adjustment program 63d. At this point, the control device 60 also automatically performs estimation of inertia of the jig J, workpiece W, etc. fixed to the fixation unit 54, and adjustment of the other parameters such as the time constant in accordance with the inertia that has been estimated. The processing by the control device 60 at this point will be described using the flowchart of FIG. 7.

The gain to be adjusted in this embodiment encompasses at least any one of gains associated with the operation speed of the first auxiliary shaft motor 31 such as velocity loop proportional gain, velocity loop integral gain, etc., position loop proportional gain, and other known gains. Also, the filter to be adjusted in this embodiment encompass at least any one of integral time constant, amplitude filter, noise filter, and other known filters.

When the execution button is pressed (step S2-1), the control device 60 controls the first auxiliary shaft motor 31 in order to execute a first motion to vibrate the workpiece support section 6 from a predetermined low frequency to a predetermined high frequency (step S2-2). Subsequently, the control device 60 automatically adjusts the gain and the filter of the first auxiliary shaft motor 31 on the basis of the results of detection of the movement position detection device of the first auxiliary shaft motor 31 at the time of the first motion being performed, the amount of the drive current of the first auxiliary shaft motor 31, the content of the control of the servo controller 64e, and a Bode plot obtained from them, etc. (step S2-3).

Subsequently, the control device 60 controls the first auxiliary shaft motor 31, after the gain and the filter of the first auxiliary shaft motor 31 has been adjusted, in order to cause the workpiece support section 6 to perform a second motion which is for example a swing motion (step S2-4). The frequency of the swing of the second motion is typically lower than the middle frequency of the first motion.

Subsequently, the control device 60 performs estimation of the inertia of the jig J, the workpiece W, or the like on the basis of the results of detection of the movement position detection device of the first auxiliary shaft motor 31 at the time of the second motion being performed, the amount of drive current of the first auxiliary shaft motor 31, the content of the control of the servo controller 64e, the inertia of the workpiece support section 6, etc. (step S2-5).

In the step S2-5, inertia of the workpiece support section 6, the jig J, and the workpiece W may be determined. In the case where only the jig J is fixed to the fixation unit 54, the inertia of the workpiece support section 6 and the jig J may be determined in the step S2-5.

Subsequently, the control device 60 performs adjustment of other parameters such as a time constant using the specified gain and filter and the estimated inertia (step S2-6). In addition, the control device 60 causes the first auxiliary shaft motor 31 to perform a predetermined motion using the specified gain and filter and the estimated inertia (step S2-7). Subsequently, the control device 60 determines appropriateness of the specified gain and filter and the appropriateness of the time constant adjusted by the estimated inertia on the basis of the results of detection of the movement position detection device of the first auxiliary shaft motor 31 at the time of the predetermined motion being performed, the amount of the drive current of the first auxiliary shaft motor 31, the content of the control of the servo controller 64e, and the like (step S2-8).

The predetermined motion may be based on the machining program 63b and may be a dedicated motion prepared for checking the gain, the filter, and the time constant adjusted by the estimated inertia.

When the appropriateness is confirmed in the step S2-7, then the control device 60 indicates that the setting is appropriate on the display device 62 (step S2-9). On the other hand, when inappropriateness is confirmed in the step S2-7, then the control device 60 displays the adjustment screen 72 on the display device 62 (step S2-10).

It should be noted that, in the above explanations, the results of detection of the movement position detection device of the first auxiliary shaft motor 31, the amount of the drive current of the first auxiliary shaft motor 31, and the content of the control of the servo controller 64e are values associated with the operation of the first auxiliary shaft motor 31. The values associated with the operation may be referred to as "operation value" in the following explanations. Also, the estimated inertia is a value calculated based on the operation value.

Figure 8:
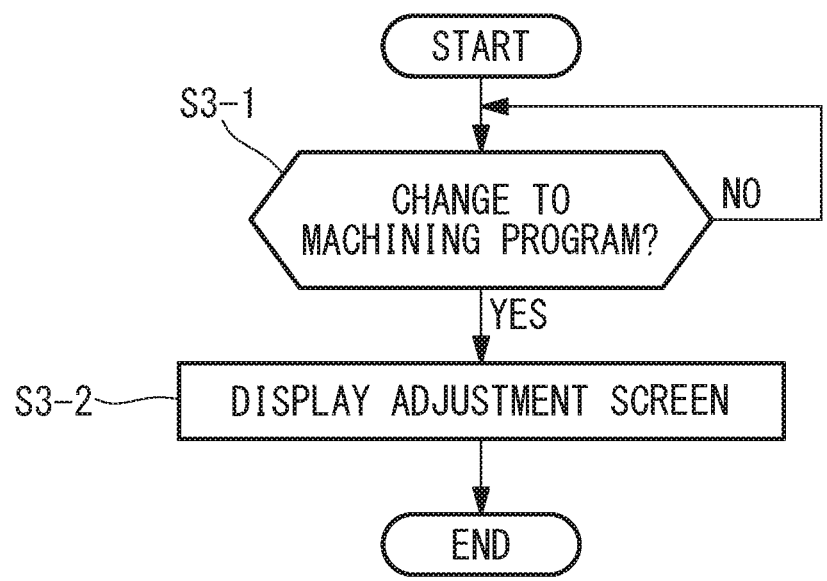
FIG. 8 is a flowchart that illustrates an example of processing by the control device of this embodiment.

In the above-described embodiment, the steps S1-1 to S1-3 are executed when the auxiliary shaft unit AU is mounted to the X-Y table 22. In contrast, the control device 60 may display the adjustment screen when machining of a certain workpiece W is completed and the machining program 63b set in the control device 60 is replaced by another machining program 63b for machining of the next workpiece W. The processing of the control device 60 in this case will be described using the flowchart of FIG. 8.

When the machining program 63b configured to be executable by the control device 60 is replaced by another machining program 63b (step S3-1), then the control device 60 displays the adjustment screen similar to that in the step S1-3 on the display device 62 (step S3-2).

Also, in the above-described embodiment, it is also possible for the control device 60 to cause the first auxiliary shaft motor 31 to perform a predetermined vibration-imparting motion or swing motion prior to the step S1-3 or the step S3-2. In this case, the control device 60 transmits a rotation command to the servo controller 64e of the first auxiliary shaft motor 31 to perform the vibration-imparting motion or swing motion. The control device 60 compares the results of detection of the movement position detection device of the first auxiliary shaft motor 31 at the time of the preparation, the amount of the drive current of the first auxiliary shaft motor 31, the content of the control of the servo controller 64e, and the like with the predetermined criterion. In this comparison, in a case where these operation values of the first auxiliary shaft motor 31 deviate from the predetermined criterion, the control device 60 may perform the step S1-3 or the step S3-2.

Figure 9:
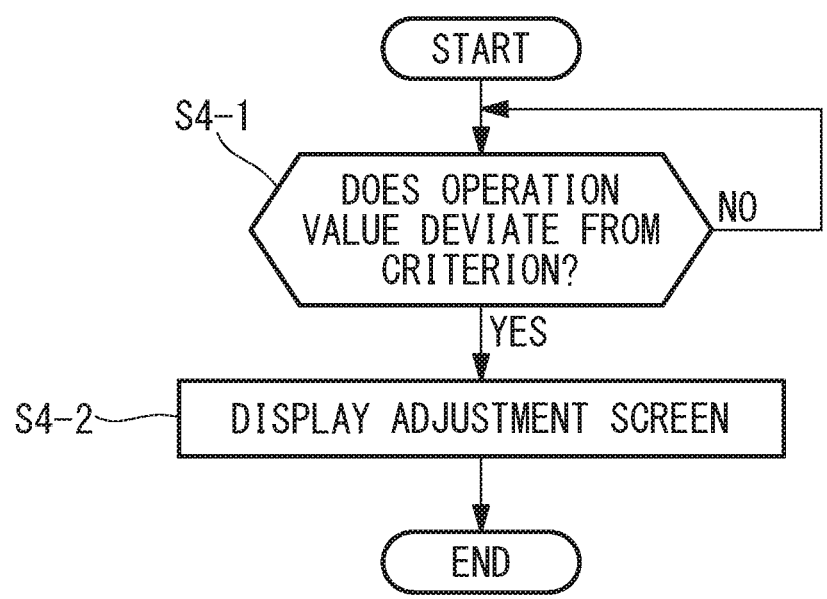
FIG. 9 is a flowchart that illustrates an example of processing by the control device of this embodiment.

Also, as illustrated in FIG. 9, the control device 60 may display an adjustment screen similar to that in the step S1-3 on the display device 62 in a case where the aforementioned operation value during the machining of the workpiece W deviates from a predetermined criterion (step S4-1) (step S4-2). Alternatively, in a case where the inertia estimated using the aforementioned operation value deviates from a predetermined criterion, the control device 60 may perform the step S4-2.

The inertia as used herein refers to the inertia of the portion to which vibrations are imparted or the portion that is swung by the first auxiliary shaft motor 31. It should be noted that, in the step S4-1, instead of executing the machining on the workpiece W by the control device 60, the control device 60 may make the first auxiliary shaft motor 31 perform a predetermined vibration-imparting motion or swing motion. In this case, the control device 60 determines, in the step S4-1, whether or not the aforementioned operation value during the vibration-imparting motion or the swing motion deviates from a predetermined criterion. It should be noted that, the aforementioned vibration-imparting motion or swing motion may be based on all or part of the machining program 63b.

The status where the aforementioned operation value deviates from a predetermined criterion refers, for example, to a status where the deviation between the results of detection of the movement position detection device and the target position is equal to or larger than a predetermined value, and a status where the results of detection of the movement position detection device or the waveform of the amount of the drive current of the first auxiliary shaft motor 31 exhibits disturbance equal to or greater than a predetermined magnitude. As another status, a status may be mentioned where a predetermined alarm is activated on the basis of the results of detection of the sensor, limiter settings, and the like, and the control device 60 recognizes the actuation of the alarm.

Figures 10, 11:
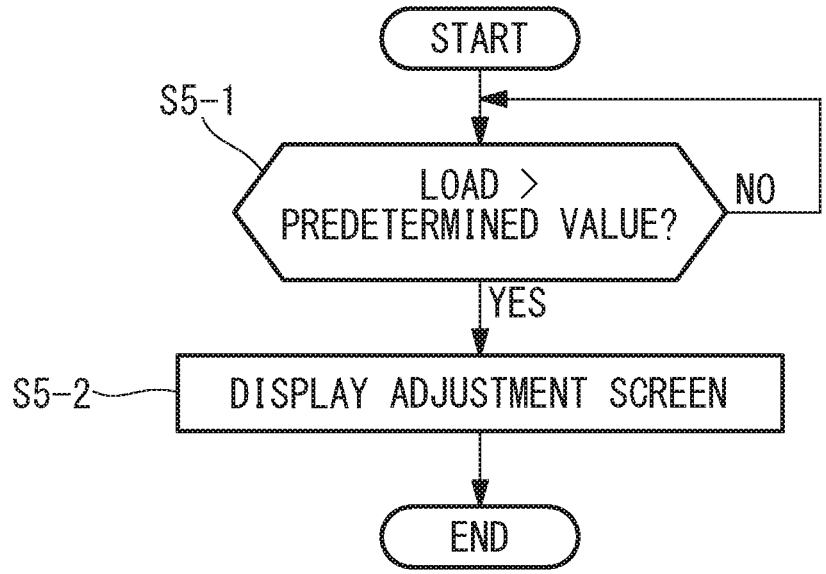
FIG. 10 is a flowchart that illustrates an example of processing by the control device of this embodiment.
FIG. 11 is an example of data stored in a storage unit of this embodiment.

Also, as illustrated in FIG. 10, when the load acting upon the first auxiliary shaft motor 31 exceeds a predetermined value in a waiting state where the first auxiliary shaft motor 31 is not operating (step S5-1), then the control device 60 may display an adjustment screen similar to that of the step S1-3 on the display device 62 (step S5-2). For example, when the weight of the jig J fixed to the fixation unit 54 exceeds a predetermined value, the amount of current for maintaining the first auxiliary shaft motor 31 in the waiting state becomes large. It can be said that the amount of current is the operation value.

It should be noted that a sensor that measures the load acting upon the fixation unit 54 may be independently provided and the determination at the step S5-1 may be made in accordance with the output of the sensor. In the case where the aforementioned camera is provided on or near the machine tool 1, an image of the fixation unit 54 may be captured by the camera and the fact that the jig J has been replaced may be determined by the control device 60 on the basis of the captured image. In this case, in the step S5-1, presence or absence of replacement of the jig J is determined.

It should be noted that the control device 60 stores, for example, as illustrated in FIG. 11, the gain, the filter, and the inertia after the adjustment in the storage unit 63 such that they correspond to the types of the workpiece W.

Also, the control device 60 transmits the gain, the filter, and the inertia after the adjustment stored in the storage unit 63 along with the information on the corresponding workpiece W for use in another machine tool 1. The destination of transmission of the information may be a host control device to which a plurality of machine tools 1 are connected or may be another machine tool 1.

In general, it is difficult to adjust the gain and the filter of the servo motor and the time points at which the adjustment will be necessary are not known. Also, even when the adjustment of the gain and the filter is performed, it is extremely difficult for a user to determine whether or not the adjustment is appropriate. For this reason, a user is often reluctant to carry out adjustment of the gain and the filter of the servo motor or unaware of the need of the adjustment.

Meanwhile, when the gain and the filter are appropriately set in accordance with the operation pattern of the operation conducted by the servo motor, the load acting on the servo motor, and the like, then the servo motor operates smoothly. However, even in the case where the gain and the filter are slightly inappropriate or the case where it is inappropriate, the servo motor in some cases will operate without causing serious problems by virtue of lowering the speed of the operation such as omission of the condition of the time constant. In this case, as a user does not carry out the difficult adjustment of the gain and the filter, the user has to use an auxiliary shaft, with performance lower than that it originally ought to have.

Conventionally, it has been necessary to operate the control device 60 of the machine tool 1 in accordance with the manual in order to perform adjustment of the gain and the filter. In the menu screen displayed on the display device 62, it takes time and labor to find out the screen for operating the gain and the filter, or in not a few cases it may be difficult to single out the screen.

In the above-described embodiment, when the control device 60 recognizes that the first auxiliary shaft motor 31 is newly mounted, when the machining program 63b has been changed, or when the operation value of the first auxiliary shaft motor 31 or the value of the inertia or the like calculated based on the operation value deviates from a predetermined criterion, then the adjustment screen 72 for adjusting the gain and the filter of the first auxiliary shaft motor 31 is displayed on the display device 62.

As a result, it is made possible for a user to perform the adjustment of the gain and the filter of the first auxiliary shaft motor 31 at an appropriate time point. Also, the time needed to find out the screen for performing adjustment of the gain and the filter can be shortened. This contributes to higher motivation for users to adjust the gain and the filter of the first auxiliary shaft motor 31.

Also, the first auxiliary shaft motor 31 of the above-described embodiment transmits the rotational force to the workpiece support section 6 without intervention of a gear of a decelerator and the like. This feature contributes to improved responsiveness between the first auxiliary shaft motor 31 and the workpiece support section 6. Meanwhile, according to this feature, movement of the first auxiliary shaft motor 31 more easily affects the precision of machining of the workpiece W, and oscillation of the first auxiliary shaft motor 31 is also likely to occur. Also, in many cases the auxiliary shaft unit AU is mounted at the discretion of users, and it is difficult to manage the machine tool 1 at the side of the manufacturer. As a result, as described above, displaying the adjustment screen 72 for performing the adjustment of the gain and the filter of the first auxiliary shaft motor 31 at the above-described time point will effectively improve the above-described situations.

The workpiece support section 6 of the auxiliary shaft unit AU is smaller in its size than the portion driven by the X-axis motor 23 and the Y-axis motor 13. As a result, the ratio of the weight of the jig J or the workpiece W to the weight of the workpiece support section 6 becomes large. Also, the X-axis motor 23 and the Y-axis motor 13 typically drive a target object via a decelerator such as a ball screw. Accordingly, the adjustment of the gain and the filter of the first auxiliary shaft motor 31 in many cases is more important than the adjustment of the X-axis motor 23 and the Y-axis motor 13.

It should be noted that the first auxiliary shaft motor 31 may be the motor that moves the workpiece support section 6 in the X-axis direction, the Y-axis direction, or the Z-axis direction. In this case as well, effects similar to those that have been described in the foregoing can be obtained.

It should be noted that, in the above-described embodiment, the inertia of the portion driven by the first auxiliary shaft motor 31 is automatically estimated. This feature is advantageous in more smoothly operating the first auxiliary shaft motor 31.

It should be noted that, the adjustment of the gain and the filter of the second auxiliary shaft motor 32 and the estimation of the inertia of the portion driven by the second auxiliary shaft motor 32 can be performed in a similar manner. Also, the adjustment of the gain and the filter of the X-axis motor 23 or the Y-axis motor 13 and the estimation of the inertia of the portion driven by the X-axis motor 23 or the Y-axis motor 13 can also be performed in a similar manner.

Also, when adjustment screen 72 for adjusting at least either of the gain and the filter of the first auxiliary shaft motor 31 is displayed on the display device 62, then effects similar to those that have been described above can be obtained.

In the above-described embodiment, the control device 60 transmits the rotation command to the servo controller 64e of the first auxiliary shaft motor 31, and displays the adjustment screen 72 on the display device 62 on the basis of the value associated with the operation of the first auxiliary shaft motor 31 at that time. For example, the adjustment screen 72 is displayed on the display device 62 only when the value associated with the operation exceeds the predetermined criterion. This feature reduces unnecessary indications on the adjustment screen 72.

It should be noted that the control device 60 may display the adjustment screen 72 on the display device 62 on the basis of the value associated with the operation of the first auxiliary shaft motor 31 at the time when the control device 60 issued the clamping or unclamping control command to the brake 41 of the auxiliary shaft unit AU. This feature is also advantageous in reducing unnecessary indications on the adjustment screen 72.

In the above-described embodiment, the adjustment screen 72 is displayed on the display device 62 on the basis of the inertia of the portion including the workpiece support section 6. In other words, the adjustment screen 72 is displayed on the display device 62 in a case where the size, weight, etc. of the jig J and the workpiece W mounted to the workpiece support section 6 have changed. This feature is advantageous in more smoothly operating the first auxiliary shaft motor 31 as the adjustment screen 72 is displayed as required at the time of the changes being made to the jig J and the workpiece W.

In the above-described embodiment, the control device 60 has the automatic adjustment program 63d that performs the automatic adjustment of the gain and the filter of the first auxiliary shaft motor 31. Also, the automatic adjustment program 63d first performs the adjustment of the gain and the filter. After that, the estimation of the inertia is performed in a state where the jig J and the workpiece W are mounted to the workpiece support section 6. When this feature is used, in a situation where the first auxiliary shaft motor 31 is connected to the workpiece support section 6 without intervention of a gear of a decelerator and the like, the operation of the first auxiliary shaft motor 31 can be appropriately adjusted.

In the above-described embodiment, the control device 60 displays the initial setting screen 71 for initial settings including pole position detection of the auxiliary shaft motor 31, 32 of the auxiliary shaft unit AU, reference position return, and the like on the display device 62 when the auxiliary shaft unit AU is newly mounted to the X-Y table 22. After that, the control device 60 causes the adjustment screen 72 to be displayed on the display device 62. According to this feature, a user will always perform the adjustment of the gain and the filter of the auxiliary shaft motors 31, 32.

In the above-described embodiment, the control device 60 stores the results of the adjustment of the gain and the filter in the storage unit 63 in such a manner that they correspond to the types of the workpiece W. According to this feature, it is made possible for the control device 60 to use the gain and the filter stored corresponding to the workpiece W when performing the machining on the workpiece W next time.

In the above-described embodiment, the control device 60 transmits the results of the adjustment of the gain and the filter stored in the storage unit 63 to another machine tool 1 or to a host control device to use them in the other machine tool 1. According to this feature, it is made possible for the other machine tool 1 to perform appropriate adjustment of the gain and the filter without performing the adjustment work of the gain and the filter.

In the above-described embodiment, whilst the adjustment screen 72 is displayed when the auxiliary shaft unit is newly mounted, when the machining program is changed, or when the operation value of the servo motor deviates from a predetermined criterion, the adjustment screen 72 as such may not be displayed, and the indication that provides guidance to adjustment screen 72 may be displayed on the display device 62. The indication that provides the guidance toward to the adjustment screen 72 may be a message that indicates the method for displaying the adjustment screen 72, a software key for displaying the adjustment screen 72, and the like.

It should be noted that the auxiliary shaft unit AU may include only the first auxiliary shaft motor 31 or may include only the second auxiliary shaft motor 32. In the case where the auxiliary shaft unit AU only includes the second auxiliary shaft motor 32, the auxiliary shaft unit AU rotates the mounted workpiece W and the jig J about the axis extending in the up-and-down direction.

Also, the direction of installation of the auxiliary shaft unit AU is not limited to the direction in which the first support section 30 and the second support section 40 are aligned in the X-axis direction or the Y-axis direction, and may also be a direction inclined by any appropriate angles with respect to the individual axes of the X-axis, the Y-axis, and the Z-axis.

Also, the fixation unit 54 is also a rotating table, and the fixation unit 54 rotates about an axial line in the horizontal direction and about the axial line in the up-and-down direction. In other words, the fixation unit 54 is a rotating table that has two rotation axes. The fixation unit 54 may be a table that has three or more rotation axes. In these cases as well, as described above, the initial setting screen 71, the adjustment screen 72, etc. associated with the fixation unit 54 are displayed, and adjustment according to these screens is performed.

REFERENCE SIGNS LIST 1 machine tool
1a machine tool main body
2 base
3 column section
4 spindle unit
4a spindle
4b spindle head
5 table unit (movement mechanism)
5a spindle motor
6 workpiece support section (rotating table)
12 Y-direction movable section
13 Y-axis motor
22 X-Y table
22a groove
23 X-axis motor
30 first support section
31 first auxiliary shaft motor
32 second auxiliary shaft motor
40 second support section
41 brake
51, 52 shaft
53 plate member
54 fixation unit (rotating table)
60 control device
61 processor
62 display device
63 storage unit
63a system program
63b machining program
63c initial setting program
63d automatic adjustment program
T tool
W workpiece
J jig
AU auxiliary shaft unit (movement mechanism)

The invention claimed is:

1. A machine tool comprising:
a spindle to which a tool is attached;
a workpiece support section that supports a workpiece;
a servo motor that rotates or moves the workpiece support section relative to the spindle; and
a control device that controls the servo motor when machining of the workpiece is performed by the tool, wherein
the control device displays an adjustment screen for adjustment of at least one of a gain and a filter of the servo motor on a display device when the control device recognizes that the servo motor is newly mounted or when a machining program of the workpiece is changed or the control device displays an indication for guidance which guides an operator to the adjustment screen on the display device when the control device recognizes that the servo motor is newly mounted, when a machining program of the workpiece is changed.

2. The machine tool according to claim 1, wherein the workpiece support section is a rotating table having one or more rotation axes, and an output shaft of the servo motor is connected to the rotating table without a decelerator.

3. The machine tool according to claim 2, wherein the operation value is a value associated with operation of the servo motor when a rotation command is issued to the servo motor, or a value associated with operation of the servo motor when a command of clamping or unclamping is issued to the servo motor or the rotating table.

4. The machine tool according to claim 2, wherein the value calculated based on the operation value is inertia of a portion that includes at least the workpiece or the workpiece support section.

5. A machine tool comprising:
a spindle to which a tool is attached;
a workpiece support section that supports a workpiece;
a servo motor that rotates or moves the workpiece support section relative to the spindle; and
a control device that controls the servo motor when machining of the workpiece is performed by the tool, wherein
the control device displays an adjustment screen for adjustment of either of a gain and a filter of the servo motor on a display device or displays an indication for guidance which guides an operator to the adjustment screen on the display device when the control device recognizes that the servo motor is newly mounted, when a machining program of the workpiece is changed, or when an operation value of the servo motor or a value calculated based on the operation value deviates from a predetermined criterion, wherein
the control device has an automatic adjustment program that performs automatic adjustment of the gain and the filter of the servo motor, and
the automatic adjustment program causes the control device to execute:
  making the servo motor perform a first motion to perform adjustment to adjust the gain and the filter;
  making the servo motor perform a second motion using the gain and the filter adjusted in the adjustment to perform calculation for determining inertia of a portion that includes at least the workpiece or the workpiece support section; and
  time constant adjustment in accordance with the inertia estimated by the calculation.

6. The machine tool according to claim 5, wherein the control device stores the results of adjustment of the gain and the filter in a storage in such a manner that the results correspond to types of the workpiece.

7. The machine tool according to claim 5, wherein the control device transmits the results of adjustment of the gain and the filter for use in another machine tool.

8. A machine tool comprising:
a spindle to which a tool is attached;
a workpiece support section that supports a workpiece;
a servo motor that rotates or moves the workpiece support section relative to the spindle; and
a control device that controls the servo motor when machining of the workpiece is performed by the tool, wherein
the control device displays an adjustment screen for adjustment of either of a gain and a filter of the servo motor on a display device or displays an indication for guidance which guides an operator to the adjustment screen on the display device when the control device recognizes that the servo motor is newly mounted, when a machining program of the workpiece is changed, or when an operation value of the servo motor or a value calculated based on the operation value deviates from a predetermined criterion, wherein
the control device is configured to receive a mounting signal when connection between the servo motor and the control device is made, the mounting signal indicating that the connection is made, and
the control device causes the display device to display a screen for initial settings including pole position detection of the newly mounted servo motor, and then causes the display device to display the adjustment screen or display the indication for guidance which guides the operator to the adjustment screen.

* * * * *